United States Patent
Lin

(10) Patent No.: US 8,248,974 B2
(45) Date of Patent: Aug. 21, 2012

(54) ALL-DIGITAL TIMING CONTROL FOR MULTI-CHANNEL FULL-DUPLEX TRANSCEIVER

(75) Inventor: Chia-Liang Lin, Fremont, CA (US)

(73) Assignee: Realtek Semiconductor Corp., Hsinchu (TW)

( * ) Notice: Subject to any disclaimer, the term of this patent is extended or adjusted under 35 U.S.C. 154(b) by 468 days.

(21) Appl. No.: 12/489,436

(22) Filed: Jun. 23, 2009

(65) Prior Publication Data
US 2009/0323566 A1 Dec. 31, 2009

Related U.S. Application Data

(60) Provisional application No. 61/075,693, filed on Jun. 25, 2008.

(51) Int. Cl.
*H04B 3/20* (2006.01)
(52) U.S. Cl. .......................................... 370/286
(58) Field of Classification Search ...................... None
See application file for complete search history.

(56) References Cited

U.S. PATENT DOCUMENTS

| | | | |
|---|---|---|---|
| 5,331,667 A * | 7/1994 | Izumi | 375/356 |
| 5,790,615 A * | 8/1998 | Beale et al. | 375/376 |
| 6,075,416 A * | 6/2000 | Dalmia | 331/25 |
| 6,798,828 B1 | 9/2004 | Phanse | |
| 6,865,241 B1 * | 3/2005 | Adkins et al. | 375/372 |
| 6,934,387 B1 | 8/2005 | Kim | |
| 7,369,637 B1 * | 5/2008 | Mauer | 375/372 |
| 2002/0122479 A1 | 9/2002 | Agazzi et al. | |
| 2003/0026369 A1 | 2/2003 | Murray et al. | |
| 2007/0273569 A1 | 11/2007 | Lin | |
| 2008/0309524 A1 * | 12/2008 | Syllaios et al. | 341/61 |

* cited by examiner

*Primary Examiner* — Ayaz Sheikh
*Assistant Examiner* — Blanche Wong
(74) *Attorney, Agent, or Firm* — Birch, Stewart, Kolasch & Birch, LLP

(57) ABSTRACT

A multi-channel full-duplex transceiver is disclosed. The transceiver comprises: a clock generator for generating a first clock and a second clock based on a control code; a plurality of transmitters for transmitting a plurality of outgoing signals onto a plurality of channels, respectively; a plurality of receivers for receiving, sampling, and equalizing in parallel a plurality of incoming signals from said plurality of channels, respectively, to generate in parallel a plurality of equalized signals, respectively; a sampling rate converter for converting in parallel said equalized signals into a plurality of refined signals, respectively. In a first operation mode, the control code is established by detecting a timing difference between an output clock of the clock generator and a reference clock. In a second operation mode, the control code is established by detecting a timing embedded in one of said refined signals.

21 Claims, 3 Drawing Sheets

ALL-DIGITAL TIMING CONTROL FOR MULTI-CHANNEL FULL-DUPLEX TRANSCEIVER

CROSS REFERENCE TO RELATED APPLICATIONS

The present application claims priority benefits under 35 U.S.C. §119(e) from U.S. Provisional Application No. 61/075,693, filed on Jun. 25, 2008, entitled "ALL-DIGITAL TIMING CONTROL FOR MULTI-CHANNEL FULL-DUPLEX TRANSCEIVER" which is hereby incorporated herein in its entirety by reference.

BACKGROUND OF THE INVENTION

1. Field of the Invention

The present invention relates generally to timing control of transceiver, in particular to all-digital timing control for multi-channel full-duplex transceiver.

2. Description of Related Art

As depicted in FIG. 1, a full-duplex communication system 100 comprises a first transceiver 110, a second transceiver 120, and a communication media 130. The first (second) transceiver 110 (120) comprises a transmitter 112 (124), a receiver 114 (122), and a duplexer 116 (126). The first transceiver 110 receives a first transmitting data TX1, encodes/modulates the data into a first electrical signal S1 suitable for transmission over the communication media 130 unto the second transceiver 120 using transmitter 112. The second transceiver 120 receives the first electrical signal S1 via duplexer 116, the communication media 130, and duplexer 126, and then decodes/demodulates the received electrical signal into a first receiving data RX1 using receiver 122. In the mean while, the second transceiver 120 receives a second transmitting data TX2, encodes/modulates the data into a second electrical signal S2 suitable for transmission over the communication media 130 unto the first transceiver 110 using transmitter 124. The first transceiver 110 receives the second electrical signal S2 via duplexer 126, the communication media 130, and duplexer 116, and then decodes/demodulates the received electrical signal into a second receive data RX2 using receiver 114. If both transceivers work perfectly, the first receiving data RX1 should match the first transmitting data TX1, while the second receiving data RX2 should match the second transmitting data. For the first (second) transceiver 110 (120), the purpose of the duplexer 116 (126), which is normally embodied by a hybrid circuit, is to allow the transmitter 112 (124) to launch an outgoing electrical signal into the communication media 130 while at the same time allow the receiver 114 (122) to receive an incoming electrical signal from the communication media 130.

A modulation scheme of particular interest to the present invention is PAM (pulse amplitude modulation), while employs a multi-level electrical signal to represent data. For instance, a PAM-4 transmitter generates a 4-level electrical signal $\{-3, -1, 1, 3\}$ to represent a two-bit data. A PAM-4 receiver, on the other hand, detects the two-bit data in accordance of the level of the received electrical signal.

To boost the amount of data that can be communicated, sometimes a plurality of channels is used for the communication media. For instance, a 4-channel communication media allows approximately four times more information to be communicated, compared to a single channel communication media, provided every one of the four channels is substantially identical to the single channel. In this case, there must be 4 transmitters, 4 receivers, and 4 duplexers in a transceiver for transmitting four sets of outgoing data and detecting four set of incoming data via the four channels, respectively.

This present invention is related to multi-channel full-duplex PAM transceiver. Throughout this disclosure, the term "local transceiver" is used to refer to one of the two transceivers involved in a full-duplex communication, and the term "remote transceiver" is used to refer to the other one of the two transceivers.

There are a few issues that need to be addressed in a multi-channel full-duplex PAM transceiver. First, the communication channel usually introduces certain distortion to the multi-level electrical signal. To correct the distortion, a function known as "equalization" is usually needed. Second, the timing with respect to which the transmitter of the remote transceiver transmits the multi-level signal is unknown. To estimate the timing, a function known as "timing recovery" is needed. Third, due to simultaneous transmitting and receiving, an interference known as "echo" originated from the transmitter of the local transceiver enters into the receiver of the local transceiver for the same channel. To alleviate this interference, a function known as "echo cancellation" is needed. Fourth, due to using multiple channels, an interference known as "NEXT" ("near-end cross talk") originated from the transmitter of the local transceiver of one channel enters into the receiver of the local transceiver of another channel. To alleviate this interference, a function known as "NEXT cancellation" is needed. Fifth, an interference known as "FEXT" ("far-end cross talk") originated from the transmitter of the remote transceiver of one channel enters into the receiver of the local transceiver of another channel. To alleviate this interference, a function known as "FEXT cancellation" is needed.

A communication standard known as "10 GBase-T" is closely related to the scope of the present invention. 10 GBase-T uses four twist pairs as communication media. Also, 10 GBase-T uses a modulation scheme known as "DSQ-128," which can be viewed as a special type of PAM. 10 GBase-T uses a special type of transmitter-side equalization known as "THP pre-coder" to pre-equalize the multi-level signal for compensating beforehand the distortion expected to be caused by the twist pair. Besides, between the two transceivers involved in a 10 GBase-T communication link, one must act as "master" while the other must act as "slave." The master transceiver transmits data to the slave transceiver in a timing (and data rate) that the master transceiver determines itself. The slave transceiver must detect the timing (and data rate) and base on the same timing (and data rate) to transmit data to the master transceiver.

What is needed is a method of timing control for a 10 GBase-T transceiver, be it master or slave.

BRIEF SUMMARY OF THIS INVENTION

In an embodiment, a method for controlling a timing for a multi-channel full-duplex transceiver is disclosed, the method comprising: generating a first clock and a second clock, where a frequency of the second clock is equal to a frequency of the first clock times I/D, where I and D are integers and I is greater than but prime to D; transmitting in parallel a plurality of outgoing symbols sequence in accordance with a timing defined by the first clock; receiving, sampling, and equalizing in parallel a plurality of incoming signals in accordance with a timing defined by the second clock to generate in parallel a plurality of equalized signals, respectively; and converting in parallel said refined signals into a plurality of refined signals, respectively, in accordance with a timing defined by the first clock.

DETAILED DESCRIPTION OF THIS INVENTION

The present invention relates to timing control of transceiver, in particular to all-digital timing control for multi-channel full-duplex transceiver. While the specifications described several example embodiments of the invention considered best modes of practicing the invention, it should be understood that the invention can be implemented in many ways and is not limited to the particular examples described below or to the particular manner in which any features of such examples are implemented. In other instances, well-known details are not shown or described to avoid obscuring aspects of the invention.

Figure 1:
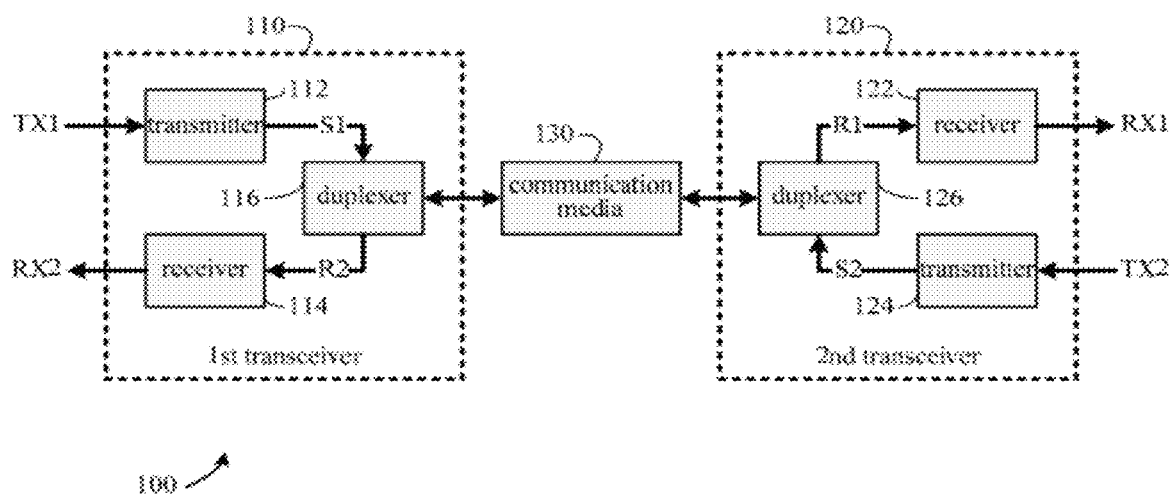
FIG. 1 shows a full-duplex communication system.
Figure 2A:
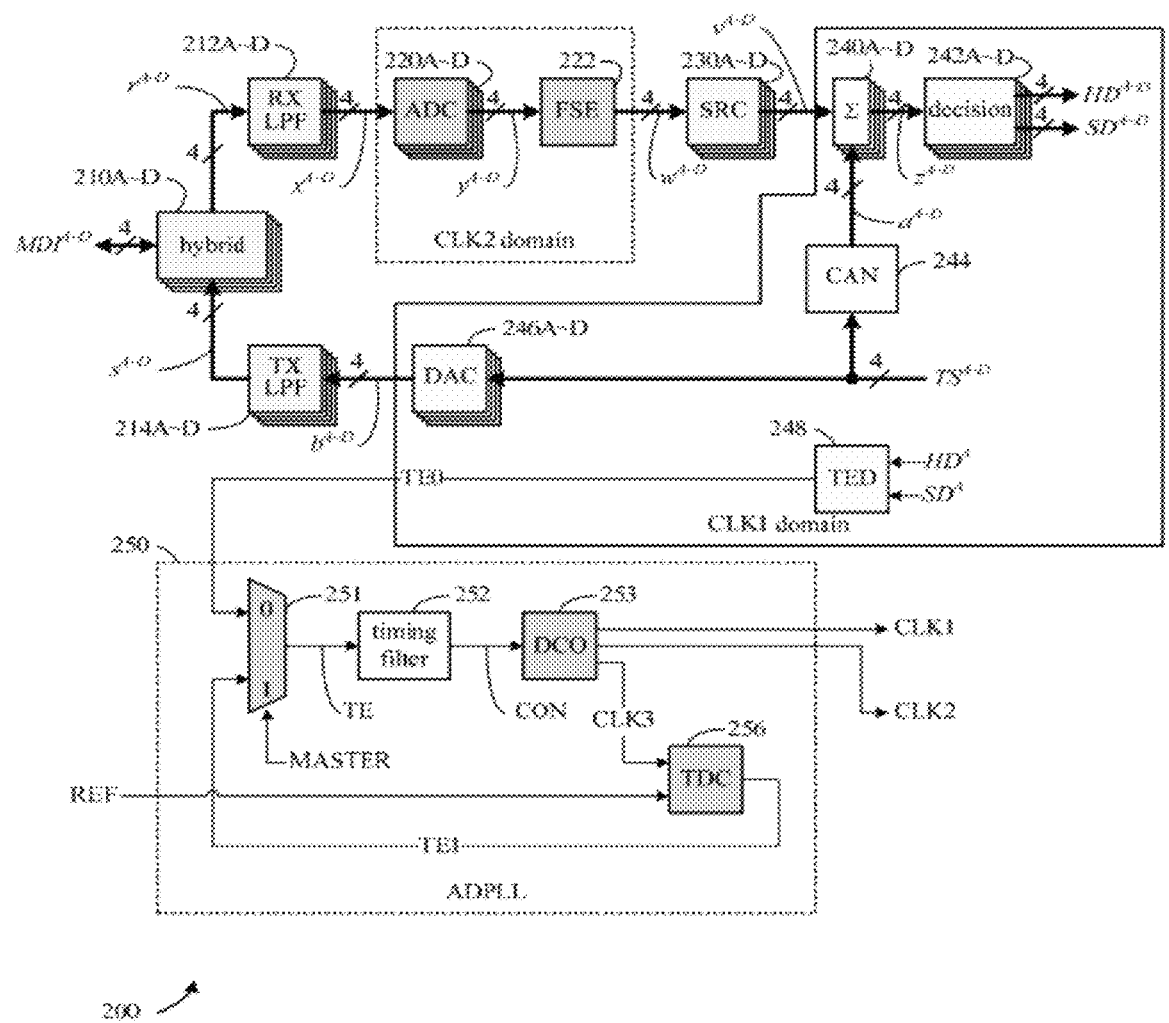
FIG. 2A shows a functional block diagram of a 4-channel full-duplex transceiver in accordance with an embodiment of the present invention.

A 4-channel full-duplex PAM transceiver 200 in accordance with the present invention is depicted in FIG. 2A. The four channels are labeled by identifiers A, B, C, and D, respectively. Transceiver 200 comprises: four hybrid circuits 210A~D (hereafter, the form "210A~D" refer to 210A, 210B, 210C, and 210D) for interfacing with four media-dependent interfaces $MDI^{A~D}$ (hereafter, the form "$MDI^{A~D}$" refer to $MDI^A$, $MDI^B$, $MDI^C$, and $MDI^D$, where the superscript denotes the channel identifier); four RX LPF (receiver low-pass filter) 212A~D for filtering four incoming analog signals $r^{A~D}$ picked up from the four media-dependent interfaces $MDI^{A~D}$ via hybrid circuits 210A~D, respectively, to generate four filtered incoming signals $x^{A~D}$, respectively; four ADC (analog-digital converters) 220A~D for converting the four filtered incoming signals $x^{A~D}$ into four digital signals $y^{A~D}$, respectively; a four-channel FSE (fractionally-spaced equalizer) 222 for equalizing the four digital signals $y^{A~D}$ into four equalized signals $w^{A~D}$; four SRC (sampling rate converters) 230A~D for converting the four equalized signals $w^{A~D}$ into four synchronized signals $v^{A~D}$; four summation circuits 240A~D for subtracting four cancellation signals $a^{A~D}$ from the four synchronized signals $v^{A~D}$ to generate four refined signals $z^{A~D}$, respectively; four decision devices 242A~D for receiving the four refined signals $z^{A~D}$ and generating four hard decisions $HD^{A~D}$ and four soft decisions $SD^{A~D}$, respectively; a four-channel canceller CAN 244 for receiving four transmit symbols $TS^{A~D}$ and generating the four cancellation signals $a^{A~D}$; four DAC (digital-to-analog converter) 246A~D for converting the four transmit symbols $TS^{A~D}$ into four outgoing analog signals $b^{A~D}$, respectively; four TX LPF (transmitter low-pass filter) 214A~D for filtering the four outgoing analog signals $b^{A~D}$ to generate four filtered outgoing signals $s^{A~D}$, respectively, to be launched into the media-dependent interfaces $MDI^{A~D}$ via hybrid circuits 210A~D, respectively; a TED (timing error detector) 248 for receiving hard decision $HD^A$ and soft decision $SD^A$ and generating a first timing error signal TE0; and an ADPLL (all-digital phase lock loop) 250 for receiving the first timing error signal TE0 and a reference clock REF and for generating a first clock CLK1 and a second clock CLK2. The first clock CLK1 is used for clocking the digital circuits in the transmitter (including DAC 246A~D) and a back-end of the receiver (including summation circuits 240A~D, decision circuits 242A~D, canceller 244, and TED 248). The second clock CLK2 is used for clocking the digital circuits in a front-end of the receiver, including: ADC 220A~D and FSE 222. Note that SRC 230A~D works across the two clock domains (CLK1, CLK2): its inputs are in the second clock CLK2 domain, while its outputs are in the first clock CLK1 domain.

The ADPLL 250 further comprises: a multiplexer 251 for selecting between the first timing error signal TE0 and a second timing error signal TE1 to generate a selected timing error signal TE in accordance with a logical signal MASTER indicating if transceiver 200 acts as master; a timing filter 252 for filtering the timing error signal TE to generate a control signal CON; a DCO (digitally controlled oscillator) for generating the first clock CLK1, the second clock CLK2, and a third clock CLK3 in accordance with the control signal CON; and a TDC (time-to-digital converter) for detecting a timing error between the third clock CLK3 and the reference REF and generating the second timing error signal TE1 to represent the timing error. When transceiver 200 acts as master (i.e. MASTER=1), ADPLL 250 generates the three clocks (CLK1, CLK2, CLK3) in accordance with a timing provided by the reference clock REF, which usually comes from a crystal oscillator. When transceiver 200 acts as slave (i.e. MASTER=0), ADPLL 250 generates the three clocks (CLK1, CLK2, CLK3) in accordance with a timing implied in the incoming analog signals $r^A$ picked up from the media-dependent interfaces $MDI^A$ via hybrid circuits 210A; the implied timing is processed through a series of receiver functions (ADC 220A, FSE 222, SRC 230A, summation circuit 240A, and decision circuit 242A) and eventually detected by TED 248 and represented by the first timing error signal TE0.

By way of example but not limitation, transceiver 200 can be used to implement a 10 GBase-T transceiver. In 10 GBase-T, the nominal symbol rate at which a message is sent from one transceiver to another is 800 Msps (mega-samples per second). That is, the four transmit symbols $TS^{A~D}$ are updated nominally 800 million times per second, and so are the four hard decisions $HD^{A~D}$ and four soft decisions $SD^{A~D}$. In this case, the nominal frequency of the first clock CLK1 is 800 MHz. In any case, the frequency of the first clock CLK1 is the same as the symbol rate of the transceiver 200. If transceiver 200 is a master (i.e. MASTER=1), than the first clock CLK1 is generated in accordance with a local reference clock REF that is usually generated from a crystal oscillator. If transceiver 200 is a slave (i.e. MASTER=0), than the first clock CLK1 is generated by the timing recovery loop involving ADC220A, FSE 222, SRC 230A, summation circuit 240A, decision circuit 242A, TED 248, and ADPLL 250, in a manner that the frequency of the first clock CLK1 tracks the frequency at which the master transceiver on the other side of the communication link sends out symbols. In either case (master or a slave), the frequency of the second clock CLK2 has a fixed relationship with the frequency of the first clock CLK1 in accordance with the following equation:

$$\text{(frequency of CLK2)} = \text{(frequency of CLK1)} \times (I/D). \quad (1)$$

Here I and D are two integers, where I is greater than D and also prime to D. This allows the frequency of the second CLK2 to be higher than that of the first clock CLK1; in this manner, ADC 220A~D are over-sampling and the condition of fractionally-spaced equalization for FSE 222 is thus satisfied. Note that with over-sampling and fractionally-spaced equalization, an offset in the phase of the sampling clock (i.e. CLK2) for ADC 220A~D can be compensated by the equalization. This allows the four channels A~D to share the same sampling clock CLK2 despite potential timing skews among the four channels. In other words, although the four channels of the communication media might have a timing skew due to a mismatch in cable length, the timing skew can be corrected by FSE 222.

In transceiver 200 of FIG. 2A, FSE 222 is a multi-input, multi-output equalizer that receives inputs $y^{A\sim D}$ and generates outputs $w^{A\sim D}$ in accordance with a FIR (finite-impulse response) filtering function that can be described by the following equations:

$$w_i^A = \sum_j (f_j^{AA} y_{i-j}^A + f_j^{AB} y_{i-j}^B + f_j^{AC} y_{i-j}^C + f_j^{AD} y_{i-j}^D) \quad (2\text{-}5)$$

$$w_i^B = \sum_j (f_j^{BA} y_{i-j}^A + f_j^{BB} y_{i-j}^B + f_j^{BC} y_{i-j}^C + f_j^{BD} y_{i-j}^D)$$

$$w_i^C = \sum_j (f_j^{CA} y_{i-j}^A + f_j^{CB} y_{i-j}^B + f_j^{CC} y_{i-j}^C + f_j^{CD} y_{i-j}^D)$$

$$w_i^D = \sum_j (f_j^{DA} y_{i-j}^A + f_j^{DB} y_{i-j}^B + f_j^{DC} y_{i-j}^C + f_j^{DD} y_{i-j}^D)$$

Here, i and j are indices for discrete-time signals or filter coefficients, and $f^{XY}$ denotes an equalization function equalizing a response from channel Y to channel X.

SRC 230A~D are sampling rate converters for converting signals $w^{A\sim D}$ into signals $v^{A\sim D}$, respectively, in accordance with a mathematical function that can be described by the following equation:

$$v_i^X = \sum_j d_{il-jD} w_j^X \quad (6)$$

for X=A, B, C, and D, where d denotes an FIR filtering function for performing an interpolation.

Canceller 244 is a multi-input, multi-output filter that receives inputs $TS^{A\sim D}$ and generates outputs $a^{A\sim D}$ in accordance with a FIR (finite-impulse response) filtering function that can be described by the following equations:

$$a_i^A = \sum_j \begin{pmatrix} h_j^{AA} \cdot TS_{i-j}^A + h_j^{AB} \cdot TS_{i-j}^B + h_j^{AC} \cdot TS_{i-j}^C + \\ h_j^{AD} \cdot TS_{i-j}^D \end{pmatrix} \quad (7\text{-}10)$$

$$a_i^B = \sum_j \begin{pmatrix} h_j^{BA} \cdot TS_{i-j}^A + h_j^{BB} \cdot TS_{i-j}^B + h_j^{BC} \cdot TS_{i-j}^C + \\ h_j^{BD} \cdot TS_{i-j}^D \end{pmatrix}$$

$$a_i^C = \sum_j \begin{pmatrix} h_j^{CA} \cdot TS_{i-j}^A + h_j^{CB} \cdot TS_{i-j}^B + h_j^{CC} \cdot TS_{i-j}^C + \\ h_j^{CD} \cdot TS_{i-j}^D \end{pmatrix}$$

$$a_i^D = \sum_j \begin{pmatrix} h_j^{DA} \cdot TS_{i-j}^A + h_j^{DB} \cdot TS_{i-j}^B + h_j^{DC} \cdot TS_{i-j}^C + \\ h_j^{DD} \cdot TS_{i-j}^D \end{pmatrix}$$

Here, i and j are indices for discrete-time signals or filter coefficients, and $h^{XY}$ denotes a function for representing a coupling from channel Y of the transmitter of the local transceiver 200 to channel X of the receiver of the local transceiver 200.

Decision circuits 242A~D receive the refined signals $z^{A\sim D}$ and generate hard decisions $HD^{A\sim D}$ and soft decisions $SD^{A\sim D}$, respectively, in accordance with the modulation scheme that the transmitter of the remote transceiver is used. In one embodiment, the soft decisions $SD^{A\sim D}$ are the same as the refined signals $z^{A\sim D}$. In an alternative embodiment where the remote transceiver uses "THP pre-coder" to perform pre-equalization, the soft decisions $SD^{A\sim D}$ are obtained by performing a modulo operation on the refined signals $z^{A\sim D}$; for instance, $SD^X = \mathrm{mod}(z^X, M)$, where X=A, B, C, D, and M is an integer that is usually a power of two. In any case, the hard decisions are taken from a multi-level set to best approximate the soft decisions and thus serve as best guesses to the symbols that were originally transmitted from the remote transceiver. If the remote transceiver uses PAM-4 to transmit symbols, for instance, then hard decisions are taken among the 4-level set {−3, −1, 1, 3} as best guesses to the symbol values that were transmitted by the remote transceiver. If the soft decision $SD^A$ is 1.21, for instance, then the hard decision $SD^A$ is 1, since among the 4-level set {−3, −1, 1, 3} the value "1" is closest to 1.21 and thus is the best guess. If the soft decision $SD^A$ is −2.87, for instance, then the hard decision $SD^A$ is −3, since among the 4-level set {−3, −1, 1, 3} the value "−3" is closest to −2.87 and thus is the best guess.

In an embodiment, the Mueller-Muller criterion is used for TED 248 to generate the timing error TE0 in accordance with the following formula:

$$TE0_i = SD_i^A \cdot HD_{i-1}^A - HD_i^A \cdot SD_{i-1}^A \quad (11)$$

where i is time index.

TDC 256 is an apparatus for detecting a time difference between two clocks (REF and CLK3) and generates a digital output (TE1) to represent the time difference. Methods for embodying a TDC are well known to those of ordinary skill and thus not described in detail here. Those who are not familiar with TDC may refer to US Patent Application Publication US2007/0273569.

DCO 253 is an apparatus for generating an oscillating clock with a frequency in response to a control code. Methods for embodying a TDC are well known to those of ordinary skill and thus not described in detail here. Those who are not familiar with DCO may refer to "All-Digital PLL and Transmitter for Mobile Phones," written by Staszewski et al, published in IEEE Journal of Solid-State Circuits, VOL 40, NO 12, December 2005. In an embodiment, DCO 253 generates a harmonic clock whose frequency is I times higher than the frequency of the first clock CLK1; furthermore, DCO 253 comprises a divide-by-I counter to divide down the harmonic clock into the first clock CLK1, and a divide-by-D counter to divide down the harmonic clock into the second clock CLK2. In this manner, DCO 253 generates the first clock CLK1 and the second clock CLK2 so that the condition in equation (1) is satisfied. In an embodiment, DCO 253 comprises a divide-by-N counter to divide down the harmonic clock into the third clock CLK3, where the divide-down ratio N is the ratio between the frequency of the harmonic clock and the frequency of the reference clock REF. By way of example (but not limitation) suitable for 10 GBase-T application: the reference clock REF is nominally 25 MHz; DCO 253 generates a harmonic clock that is nominally 4 GHz; the harmonic clock is divided down by 5 to generate the first clock CLK1 that is nominally 800 MHz; the harmonic clock is also at the same time divided down by 4 to generate the second clock CLK2 that is nominally 1 GHz; and the harmonic clock is also at the same time divided down by 160 to generate the third clock CLK3 that is nominally 25 MHz.

In an embodiment, timing filter 252 is a digital filter for embodying the following z-domain transfer function:

$$H(z) = K_P z^{-1} + \frac{K_I z^{-1}}{1 - z^{-1}} \tag{12}$$

Hybrid circuit 210A~D is an apparatus for providing an interface for allowing an outgoing signal and an incoming signal to share the same communication media. Methods for embodying a hybrid circuit are well known to those of ordinary skill in the art and thus not explained in detail here. Those who are not familiar with hybrid circuit may refer to US Patent Application Publication 2006/0222173.

Low pass filters (212A~D, 214A~D), analog-to-digital converters (220A~D), and digital-to-analog converters (246A~D) are all well known to those of ordinary skill in the art and thus not described in detail here.

Figure 2B:
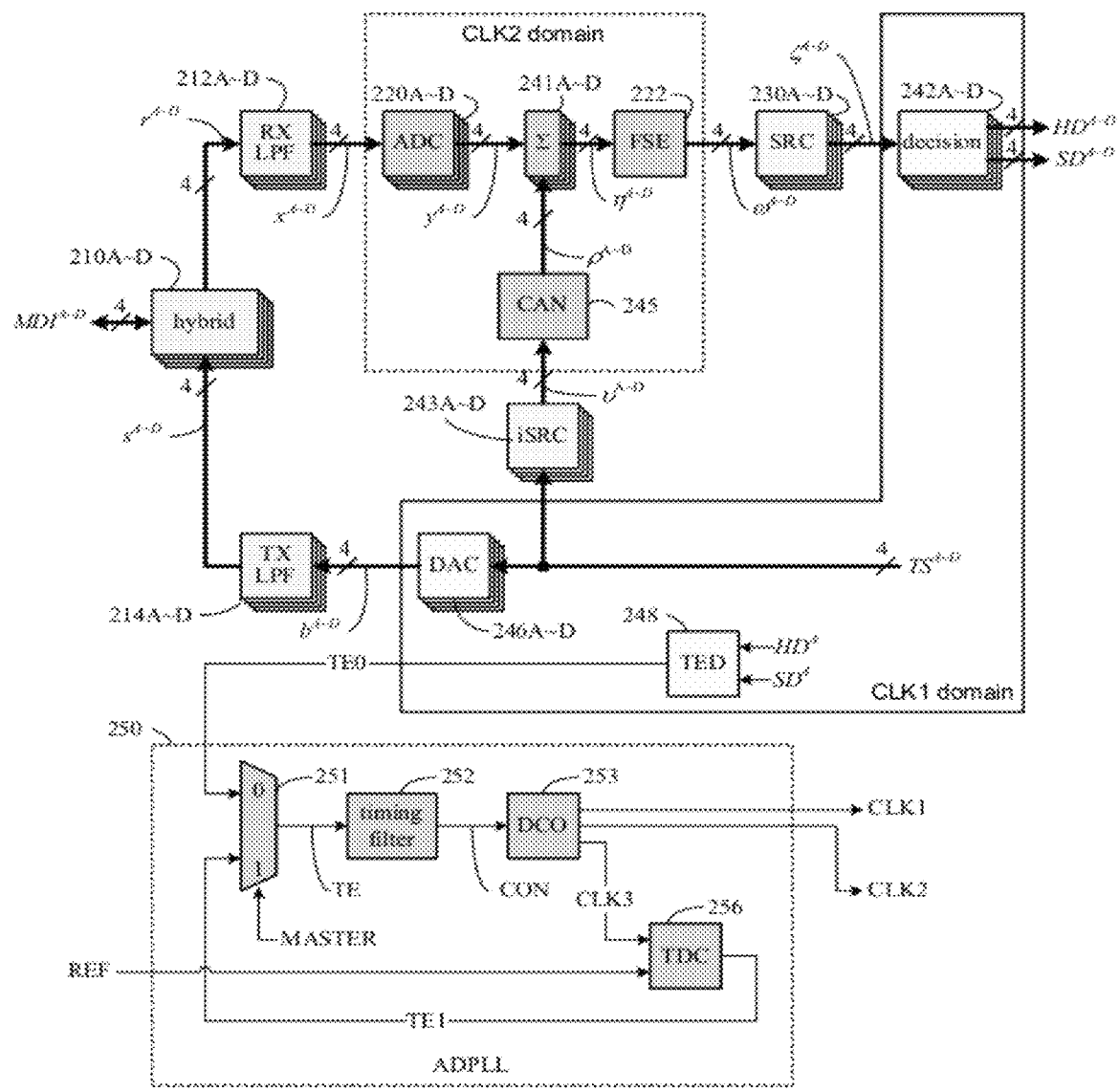
FIG. 2B shows a functional block diagram of a 4-channel full-duplex transceiver in accordance with an alternative embodiment of the present invention.

In an alternative embodiment, echo and NEXT cancellation is performed in the CLK2 domain instead of in the CLK1 domain. Transceiver 201 depicted in FIG. 2B is an exemplary embodiment for performing echo and NEXT cancellation in the CLK2 domain. Transceiver 201 of FIG. 2B is identical to transceiver 200 of FIG. 2A, except for the following difference: in transceiver 201 the cancellation function, performed via canceller 245 and summation circuit 241A~D, is performed in CLK2 domain prior to fractionally-spaced equalization (FSE), as opposed to the case in transceiver 200, where the cancellation function, performed via canceller 244 and summation circuits 240A~D, is performed in CLK1 domain after the fractionally-spaced equalization (FSE). Due to performing the cancellation function prior to the fractionally-spaced equalization in the CLK2 domain, inverse sampling rate converters (iSRC) 243A~D are inserted by converting the four transmit symbols $TS^{A \sim D}$ in the CLK1 domain into four converted signals $v^{A \sim D}$ in the CLK2 domain, respectively, in accordance with a mathematical function that can be described by the following equation:

$$v_i^X = \sum_j c_{iD-jI} TS_j^X \tag{13}$$

for X=A, B, C, and D, where c denotes an FIR filtering function for performing an interpolation.

In an embodiment, filter coefficients in canceller (244 in FIG. 2A or 245 in FIG. 2B) and FSE (222 in FIG. 2A or FIG. 2B) are all adapted in a least-mean-square (LMS) manner to minimize a mean squared difference between the hard decision $SD^X$ and soft decision $SD^X$, for X=A, B, C, and D. LMS adaptation for filter coefficients are well known to those of ordinary skill in the art and thus not described in detail here. However, when the adaptive filter of interest operates in a different clock domain from the clock domain for the hard decision $SD^X$ and soft decision $SD^X$, a inverse sampling rate conversion (iSRC) function needs to be performed to convert for the hard decision $SD^X$ and soft decision $SD^X$ into the clock domain of the adaptive filter of interest in order to perform LMS adaptation. This applies to adapting FSE 222 (in either FIG. 2A or FIG. 2B) and canceller 245 in FIG. 2B. An iSRC function takes the form of (13).

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for controlling a timing for a multi-channel full-duplex transceiver, the method comprising the following steps:

generating a first clock and a second clock using a controlled oscillator in accordance with a control code, where a frequency of the second clock corresponds to a frequency of the first clock;

transmitting in parallel a plurality of outgoing signals onto a plurality of channels, respectively, in accordance with a timing defined by the first clock;

receiving, sampling, and equalizing in parallel a plurality of incoming signals from said plurality of channels, respectively, in accordance with a timing defined by the second clock to generate in parallel a plurality of equalized signals, respectively;

converting in parallel said plurality of equalized signals into a plurality of refined signals, respectively, in accordance with a timing defined by the first clock; and generating the control code, wherein in a first operation mode the control code is established by detecting a timing difference between an output clock of the controlled oscillator and a reference clock, and in a second operation mode the control code is established by detecting a timing embedded in one of said refined signals.

2. The method of claim 1, wherein the first clock is generated by dividing the output clock of the controlled oscillator by a factor of I, and the second clock is generated by dividing the output clock of the controlled oscillator by a factor of D; wherein I and D are integers and I is greater than but prime to D.

3. The method of claim 1, wherein the timing difference between the output clock of the controlled oscillator and the reference clock is detected by a time-to-digital converter.

4. The method of claim 1, further comprising generating a plurality of soft decisions and a plurality of hard decisions for said plurality of refined signals, respectively.

5. The method of claim 4, wherein the timing embedded in one of said refined signals is detected using the soft decision and the hard decision associated with the one of said refined signals.

6. The method of claim 1, further comprising using a fractionally-spaced equalizer for equalizing in parallel said plurality of incoming signals.

7. The method of claim 1, further comprising using a plurality of echo cancellers for canceling the interference on said plurality of incoming signals from said plurality of outgoing signals.

8. The method of claim 1, further comprising using a sampling rate converter for converting in parallel said equalized signals into said plurality of refined signals.

9. The method of claim 1, wherein generating the control code further comprising performing a filtering function.

10. A multi-channel full-duplex transceiver comprising:

a plurality of transmitters for transmitting a plurality of outgoing signals onto a plurality of channels, respectively, in accordance with a timing defined by a first clock;

a plurality of receivers for receiving, sampling, and equalizing in parallel a plurality of incoming signals from said plurality of channels, respectively, in accordance with a timing defined by a second clock to generate in parallel a plurality of equalized signals, respectively;

a plurality of sampling rate converters for converting in parallel said plurality of equalized signals into a plurality of refined signals, respectively, in accordance with a timing defined by the first clock; and a clock generator for generating the first clock and second clock using a controlled oscillator based on a control code, wherein in a first operation mode the control code is established by detecting a timing difference between an output clock of the controlled oscillator and a reference clock, and in a second operation mode the control code is established by detecting a timing embedded in one of said refined signals.

11. The transceiver of claim 10, wherein the first clock is generated by dividing down the output clock of the controlled oscillator by a factor of I, and the second clock is generated by dividing the output clock of the controlled oscillator by a factor of D, where I and D are integers and I is greater than but prime to D.

12. The transceiver of claim 10, wherein the timing difference between the output clock of the controlled oscillator and the reference clock is detected by a time-to-digital converter.

13. The transceiver of claim 10, further comprising a plurality of decision devices for generating a plurality of soft decisions and a plurality of hard decisions for said plurality of refined signals, respectively.

14. The transceiver of claim 13, wherein the timing embedded in one of said refined signals is detected using the soft decision and the hard decision associated with the one of said refined signals.

15. The transceiver of claim 10, further comprising a fractionally-spaced equalizer for equalizing in parallel said plurality of incoming signals.

16. The transceiver of claim 10, further comprising a plurality of echo cancellers for canceling the interference on said plurality of incoming signals from said plurality of outgoing signals.

17. The transceiver of claim 10, wherein the all-digital phase lock loop further comprises a filter.

18. A multi-channel full-duplex transceiver comprising:

a clock generator for generating a first clock and a second clock using a controlled oscillator based on a control code, wherein the first clock and the second clock are dependent, wherein a first clock domain and a second clock domain are defined by the first clock and the second clock, respectively;

a plurality of transmitters, located in the first clock domain, for transmitting a plurality of outgoing signals onto a plurality of channels, respectively;

a plurality of receivers, located in the second clock domain, for receiving, sampling, and equalizing in parallel a plurality of incoming signals from said plurality of channels, respectively, to generate in parallel a plurality of equalized signals, respectively;

a plurality of sampling rate converters, located between the first clock domain and the second clock domain, for converting in parallel said plurality of equalized signals into a plurality of refined signals, respectively.

19. The transceiver of claim 18, wherein the transceiver operates in a first operation mode or a second first operation mode according to the control code, wherein the control code is determined by whether the transceiver is a master transceiver or not.

20. The transceiver of claim 18, wherein in a first operation mode the control code is established by detecting a timing difference between an output clock of the clock generator and a reference clock, and in a second operation mode the control code is established by detecting a timing embedded in one of said refined signals.

21. The transceiver of claim 18, wherein the control code corresponds to at least one of the plurality of refined signals.

* * * * *